(12) United States Patent
Franklin et al.

(10) Patent No.: US 9,311,413 B1
(45) Date of Patent: Apr. 12, 2016

(54) FACETED APPLICATION SEARCH

(75) Inventors: Jason Franklin, San Francisco, CA (US); Anand Kashyap, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 677 days.

(21) Appl. No.: 13/594,669

(22) Filed: Aug. 24, 2012

(51) Int. Cl.
   *G06F 17/30* (2006.01)
(52) U.S. Cl.
   CPC ...... *G06F 17/30867* (2013.01); *G06F 17/3053* (2013.01)
(58) Field of Classification Search
   CPC .......... G06F 17/30867; G06F 17/3053; G06F 17/30598; G06F 17/30991
   USPC .......................... 707/722, 723, 728, 732, 749
   See application file for complete search history.

(56) References Cited

U.S. PATENT DOCUMENTS

| | | | |
|---|---|---|---|
| 2010/0036802 A1* | 2/2010 | Tsuruta et al. | 707/2 |
| 2013/0191397 A1* | 7/2013 | Avadhanam et al. | 707/748 |
| 2014/0006374 A1* | 1/2014 | Forte | G06F 17/30867 707/709 |

OTHER PUBLICATIONS

Google Blog, "New ways to discover great apps on Android Market", May 11, 2011, retrieved Aug. 24, 2012 from : http://web.archive.org/web/20110716082751/http://googlemobile.blogspot.com/2011/05/new-ways-to-discover-great-apps-on.html.
Kellex, "Android Market Now Allows for Content Filtering", May 14, 2011, retrieved Aug. 24, 2012 from: http://www.droid-life.com/2011/05/14/android-market-now-allows-for-content-filtering/.
RuleSpace Technology—Product Overview. Jun. 21, 2011, retrieved Aug. 24, 2012 from: http://web.archive.org/web/20110621135147/http://rulespace.com/product-overview/php.
Mozilla Firefox Add-Ons, "Library Detector", May 30, 2010, retrieved Aug. 24, 2012 from https://addons.mozilla.org/en-US/firefox/addon/library-detector/.

* cited by examiner

*Primary Examiner* — Hares Jami
(74) *Attorney, Agent, or Firm* — Wilmer Cutler Pickering Hale and Dorr LLP

(57) ABSTRACT

The subject matter of this specification can be implemented in, among other things, a method that includes receiving, from a computing device, one or more user inputs that include levels of relevance for multiple facets of multiple applications. Each of the facets represents a different set of behaviors from a plurality of behaviors of the applications. Each one of the applications has an associated value for each of the facets based on the set of behaviors of each of the applications. The method further includes organizing a list of the applications based on the levels of relevance for the facets and the value of each of the facets for each of the applications. The method further includes providing, to the computing device, the list of the applications for presentation on a display device at the computing device.

12 Claims, 4 Drawing Sheets

FACETED APPLICATION SEARCH

TECHNICAL FIELD

This instant specification relates to organizing a list of applications based on facets of the applications.

BACKGROUND

Online application providers often allow users to purchase electronic copies of applications from a website using a browser application or other online application. The online application providers generally provide many applications and allow users to search for specific applications. For example, an online application provider may allow a user to input a search term that includes part of a name of an application and, in response, the online application provider provides a list of applications whose names include the search term. In another example, an online application provider may provide a list of the most popular applications (e.g., those applications that are most frequently downloaded by users). In some cases, the online application provider may provide lists of the most popular applications in multiple categories, such as game applications, communication applications, and productivity applications. The online application provider may further divide the categories into separate lists for free applications and applications that have a fee.

SUMMARY

In one aspect, a computer-implemented method includes receiving, from a computing device, one or more user inputs that include levels of relevance for multiple facets of multiple applications. Each of the facets represents a different set of behaviors from a plurality of behaviors of the applications. Each one of the applications has an associated value for each of the facets based on the set of behaviors of each of the applications. The method further includes organizing a list of the applications based on the levels of relevance for the facets and the value of each of the facets for each of the applications. The method further includes providing, to the computing device, the list of the applications for presentation on a display device at the computing device.

Implementations can include any, all, or none of the following features. Organizing the list of the applications can include at least one of sorting or filtering the list of the applications based on the levels of relevance for the facets and the value of each of the facets for each of the applications. The method can include receiving, from the computing device, a user selection of an application from the list of the applications. The method can further include in response to receiving the user selection, causing the application to be installed at the computing device. The facets can include two or more different types selected from a money facet type, a time facet type, a content facet type, and a privacy facet type.

In one aspect, a computer-readable medium stores instructions that when executed cause a computer to perform operations including receiving, from a computing device, one or more user inputs that include levels of relevance for multiple facets of multiple applications. Each of the facets represents a different set of behaviors from a plurality of behaviors of the applications. Each one of the applications has an associated value for each of the facets based on the set of behaviors of each of the applications. The operations further include organizing a list of the applications based on the levels of relevance for the facets and the value of each of the facets for each of the applications. The operations further include providing, to the computing device, the list of the applications for presentation on a display device at the computing device.

Implementations can include any, all, or none of the following features. Organizing the list of the applications can include at least one of sorting or filtering the list of the applications based on the levels of relevance for the facets and the value of each of the facets for each of the applications. The operations can include receiving, from the computing device, a user selection of an application from the list of the applications. The operations can further include in response to receiving the user selection, causing the application to be installed at the computing device. The facets can include two or more different types selected from a money facet type, a time facet type, a content facet type, and a privacy facet type.

In one aspect, a computer-implemented system includes a memory to store values for multiple facets of multiple applications. Each of the facets represents a different set of behaviors from a plurality of behaviors of the applications. Each one of the applications has an associated one of the values for each of the facets based on the set of behaviors of each of the applications. The system further includes an interface to receive, from a computing device, one or more user inputs that include levels of relevance for the facets of the applications. The system further includes a processor to organize a list of the applications based on the levels of relevance for the facets and the values of the facets for each of the applications, and to provide, to the computing device through the interface, the list of the applications for presentation on a display device at the computing device.

Implementations can include any, all, or none of the following features. The processor can be further to organize the list of the applications by at least one of sorting or filtering the list of the applications based on the levels of relevance for the facets and the values of the facets for each of the applications. The interface can be further to receive, from the computing device, a user selection of an application from the list of the applications. In response to receipt of the user selection, the processor can be further to cause the application to be installed at the computing device. The facets can include two or more different types selected from a money facet type, a time facet type, a content facet type, and a privacy facet type.

The details of one or more implementations are set forth in the accompanying drawings and the description below. Other features and advantages will be apparent from the description and drawings, and from the claims.

DETAILED DESCRIPTION

This document describes systems and techniques for organizing a list of applications based on facets of the applications. Each facet is an abstraction for one or more behaviors of the applications. In addition, each facet represents a particular user-sensitivity, such as a user's level of interest in the overall monetary cost of an application (e.g., money), the overall time spent using the application (e.g., time), the types of content presented by the application (e.g., content), and how the application handles private information (e.g., privacy). The systems and techniques allow a user to indicate how relevant the various facets are to the user's search for applications. The systems and techniques then apply those relevancies to the individual behaviors of the applications to organize a list of the applications and present the organized list of the applications to the user. The user may then, for example, select an application from the organized list of applications for installation at the user's computing device.

Figure 1:
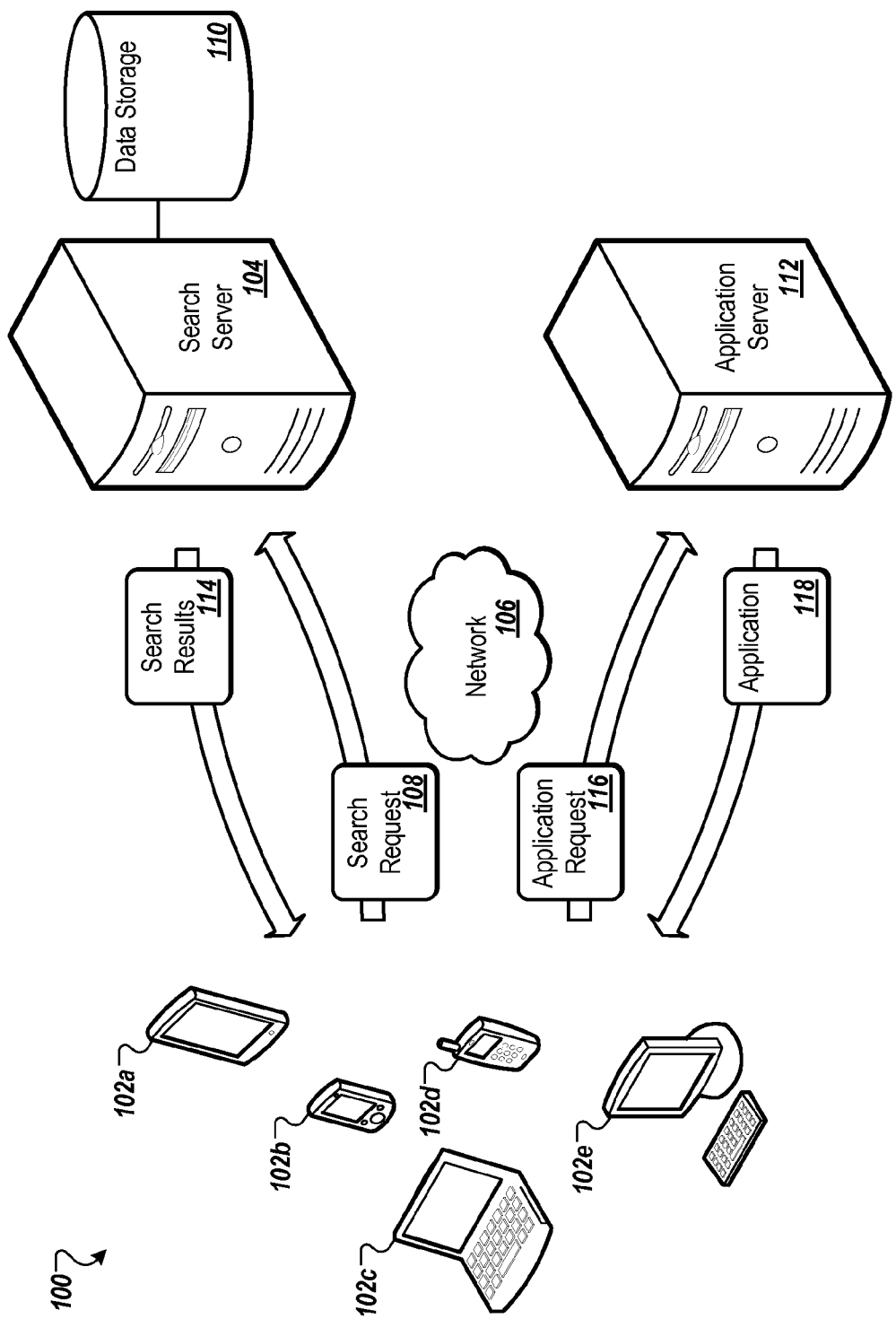
FIG. 1 is a schematic diagram that shows an example of a system for organizing a list of applications based on facets of the applications.

FIG. 1 is a schematic diagram that shows an example of a system 100 for organizing a list of applications based on facets of the applications. The system 100 includes multiple computing devices 102a-e in communication with a search server 104 over a network 106, such as one or more local networks and/or the Internet.

The computing devices 102a-e can include various types of computing devices, such as smart phones, desktop computing devices, laptop computing devices, and tablet computing devices. In some implementations, the computing devices 102a-e only include mobile computing devices, such as smart phones and tablets. In some implementations, the computing devices 102a-e use the same operating system, such as a particular desktop operating system or a particular mobile device operating system. A user can make one or more user inputs at a computing device, such as the computing device 102b, that include a search request 108 for applications. The computing device 102b sends the search request 108 to the search server 104.

The search server 104 receives and processes the search request 108. The search request 108 includes levels of relevance for multiple facets of the applications. The facets can include, for example, money, time, content, and/or privacy. The level of relevance indicates how important the particular facet is to the user. In some implementations, the levels of relevance can be provided in advance and stored at the search server 104 in a data storage 110. The search server 104 can then retrieve the levels of relevance from the data storage 110 in response to receiving the search request 108.

The data storage 110 also stores values for behaviors of the applications. The search server 104 calculates values for the facets of the applications based on the values for the behaviors of the applications. The calculation can include multiplying and/or adding together each of the values for the behaviors of an application that are related to a particular facet to calculate the value for the facet.

For example, the search server 104 can calculate the value for the money facet of an application based on values for behaviors of the application related to the money facet. A first money related behavior can include whether the application makes in-application purchases in addition to any initial cost of the application. Another money related behavior can include whether the application sends messages that may have a fee, such as Short Message Service (SMS) and/or Multimedia Messaging Service (MMS) messages. Another money related behavior can include whether the application collects personally identifiable information, such as information that could be used to identify financial accounts.

In another example, the search server 104 can calculate the value for the time facet of an application based on other behaviors related to the time facet. A first time related behavior can include local resource usage at the computing device 102b by the application, such as central processing unit (CPU) of graphics processing unit (GPU) usage, battery usage, network usage, random access memory (RAM) usage, and usage of long term storage space. The value for the local resource usage indicates the degree to which local resources are used by the application. Another time related behavior can include stability of the application in operation at the computing device 102b, e.g., an indication of how often the application crashes and/or how often the application receives updates to be downloaded. Another time related behavior can include advertisements, e.g., an indication of how often advertisements are presented, how intrusive the advertisements are, and/or whether the advertisements can be closed.

In another example, the search server 104 can calculate the value for the content facet of an application based on other behaviors related to the content facet. A first content related behavior can include whether the application has access to social networks. The social network behavior is an indication of how limited and/or controlled access to adult and/or offensive material may be through the social network. Another content related behavior can include direct access to adult and/or offensive content. The adult/offensive behavior may indicate a suggested level of maturity for a user of the application and/or how offensive the content presented by the application may be.

In another example, the search server 104 can calculate the value for the privacy facet of an application based on behaviors related to the privacy facet. A first privacy related behavior can include the previously described social network behavior. In the context of the privacy facet, the social network behavior indicates how private the personal information of the user may be with respect to access by the application of the social network. Another privacy related behavior includes a tracking behavior. The tracking behavior is an indication of how intrusive any tracking of the user may be by the application, such as the geographic location of the user and/or personal data (e.g., browsing history). Another privacy related behavior includes the previously described personally identifiable information. This behavior is an indication of how much the application may be collecting, storing, and sharing the personally identifiable information of the user.

The behaviors of the applications are identified from static and/or dynamic attributes of the applications. For example, the search server 104 may identify a value for the in-application purchase behavior based on whether the application accesses a library for in-application purchases and/or based on an application-store identifier of the application that is associated with ability to perform in-application purchases. In another example, the search server 104 can identify a value for the social network behavior by checking for access to particular web addresses, such as uniform resource locators (URLs) and identifiers (URIs). The search server 104 can perform a static analysis of software code for the application and/or a dynamic analysis at runtime of addresses and ports accessed to identify the web addresses.

The search server 104 can identify a value for the tracking behavior of an application by detecting anomalies at runtime (e.g., amount of data transmitted and/or type of content being transmitted) and/or by detecting access to a particular service that tracks user information, such as an advertisement network. The search server 104 can identify a value for the adult/offensive behavior by performing a sentiment analysis of reviews for the application. The search server 104 may retrieve the reviews from an application server 112 that hosts the application and/or another system that provides reviews of applications. The search server 104 can also identify the adult/offensive behavior from metadata associated with the application, such as a name, description, and/or adult/offensive attribute provided by the application server 112.

The search server 104 can identify a value for the messaging service behavior by determining that an application has permission to send messages through the messaging service, e.g., from the metadata at the application server 112 and/or from runtime analysis of the application. The search server 104 can identify a value for the personally identifiable information behavior by determining that the application accesses a service, such as a particular advertisement network.

The search server 104 can identify a value for the resource usage behavior by analyzing historical resource usage data from a runtime analysis of the application. The search server 104 can also identify the value for the resource usage behavior by sentiment analysis of reviews for the application (e.g., occurrences of the word "slow") and/or by detecting anomalies at runtime (e.g., unresponsiveness). The search server 104 can identify a value for the stability behavior by sentiment analysis of reviews (e.g., occurrences of the word "crash"), a runtime analysis of the amount of time used to perform actions within the application, and anomaly detection (e.g., crash reports at runtime). The search server 104 can identify a value for the advertisement behavior by scanning software code of the application for access to advertisement libraries and/or runtime analysis of web addresses accessed by the application for addresses of advertisement networks.

For each facet, the search server 104 combines the values for the behaviors of an application for the facet. The search server 104 then scales the values for the facets for each application based on the levels of relevance from the user. Finally, the search server 104 organizes the applications based on the scaled facets of the applications. For example, the search server 104 may filter applications from the list that do not have a threshold value for a particular facet. In another example, the search server 104 may sort the list of applications based on the scaled values of the facets.

In some implementations, the search server 104 combines the facets of an application, such as by adding and/or multiplying the facets together, and then sorts the list of applications based on the combined facet value of each application. Alternatively, the search server 104 can apply the facets of the applications in a particular order when sorting the list of applications. In some implementations, the search server 104 can allow the user to specify the order in which the facets are used to sort the list of applications.

The search server 104 provides the filtered and/or sorted list of applications to the computing device 102b as one or more search results 114. The user at the computing device 102b may then select a particular application from the list, for example, for installation at the computing device 102b. The computing device 102b sends an application request 116 for the application. The computing device 102b may send the application request 116 directly to the application server 112 or first to the search server 104. The search server 104 can provide an application 118 in response to the application request 116 (e.g., from the data storage 110) or direct the application request 116 to the application server 112. In which case, the application server 112 provides the application 118 to the computing device 102b for installation at the computing device 102b.

Figure 2:
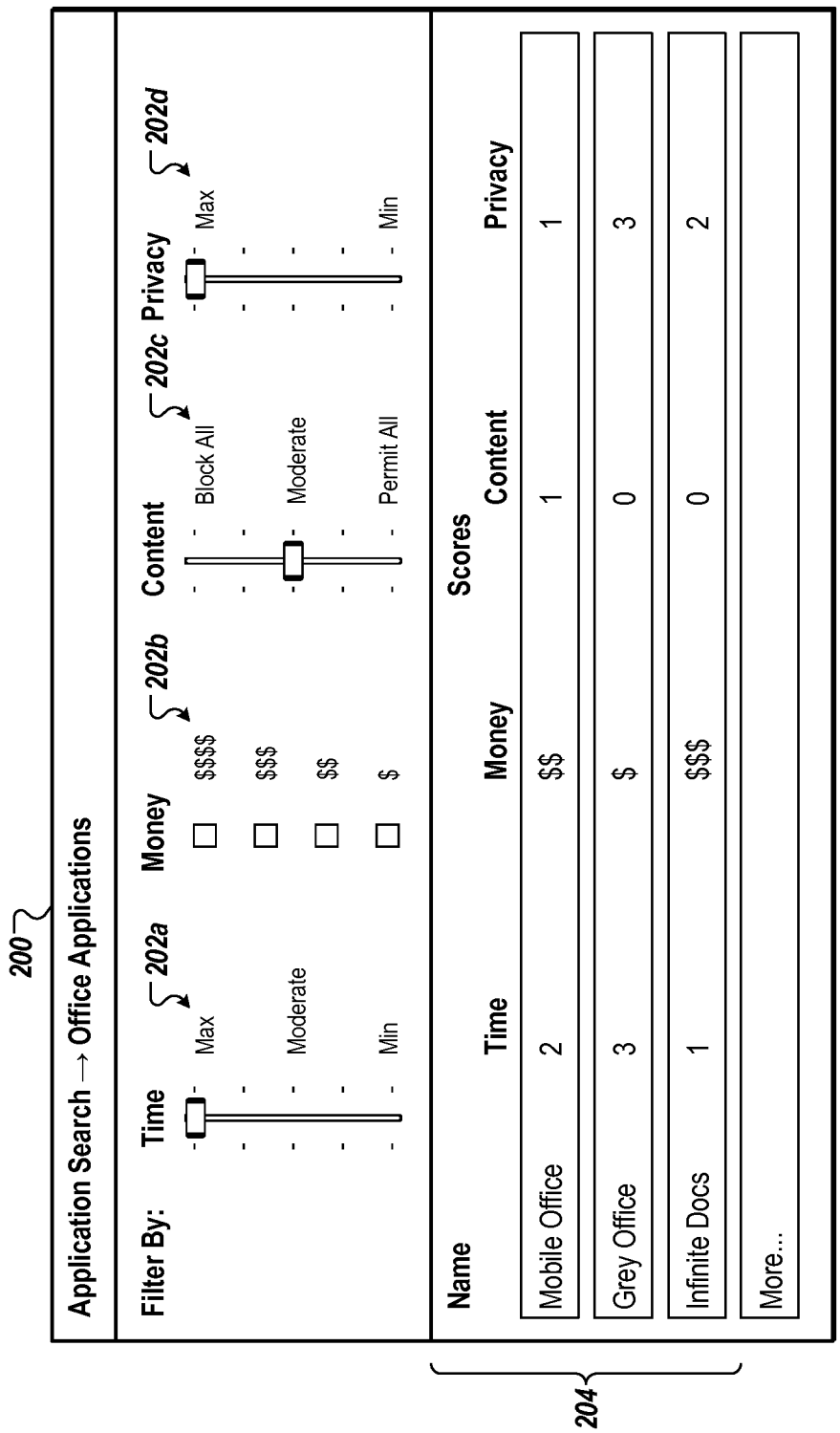
FIG. 2 is an example of a graphical user interface for organizing a list of applications based on facets of the applications.

FIG. 2 is an example of a graphical user interface 200 for organizing a list of applications based on facets of the applications. The graphical user interface 200 can be provided by a local application at a client computing device, such as the computing device 102b, and/or by a web interface in a browser application at the client computing device. The graphical user interface 200 communicates with a server computing system, such as the search server 104.

In particular, the graphical user interface 200 presents multiple input controls 202a-d that allow a user to select levels of relevance for multiple facets of the applications. The first input control 202a is a slider control that allows the user to select a particular level of relevance for the time facet (e.g., maximum relevance, moderate relevance, or minimum relevance). The second input control 202b is a multi-select checkbox control that allows the user to select one or more levels of relevance for the money facet (e.g., one or more of four ratings for level of relevance for money). The third input control 202c is a slider control that allows the user to select a level of relevance for the content facet (e.g., block all adult/offensive content, block a moderate amount of adult/offensive content, or permit all adult/offensive content). The fourth input control 202d is a slider control that allows the user to select a level of relevance for the privacy facet (e.g., maximum level of privacy protection, moderate level of privacy protection, or minimum level of privacy protection).

The local computing device receives the levels of relevance from the user through the graphical user interface 200 and provides the levels of relevance to the server computing system. The local computing device may also receive other inputs from the user, such as keywords and/or categories (e.g., an office application category) of the applications, and also provides the other inputs to the server computing system. In response, the server computing system searches through a list of applications (e.g., in the data storage 110) for applications meeting the conditions provided by the user (e.g., any keywords, any category, and the levels of relevance). The server computing system organizes the list of applications that satisfy the search criteria, if any, using the levels of relevance of each of the facets. For example, the server computing system can filter and/or sort the list of applications based on the levels of relevance of the facets.

The server computing system than provides the list of applications to the client computing device. The client computing device presents the list of applications in a list area 204. The list area 204 includes the name of each application in the list as well as a value for each facet of each application.

In some implementations, the graphical user interface 200 allows a user to request additional information about a particular value of a particular facet for an application by, for example, selecting the value of the facet. The graphical user interface 200 then presents additional information, such as values of the behaviors for the facet and/or operations performed by the application or information about the application from which the values for the behaviors are derived.

In some implementations, the graphical user interface 200 allows a user to request installation of an application, for example, by selecting the name of the application. In response, the client computing device then sends a request to the server computing system and/or an application server system (e.g., the application server 112) for the application. The server computing system and/or the application server system then provides the application to the client computing device for installation at the client computing device.

Figure 3:
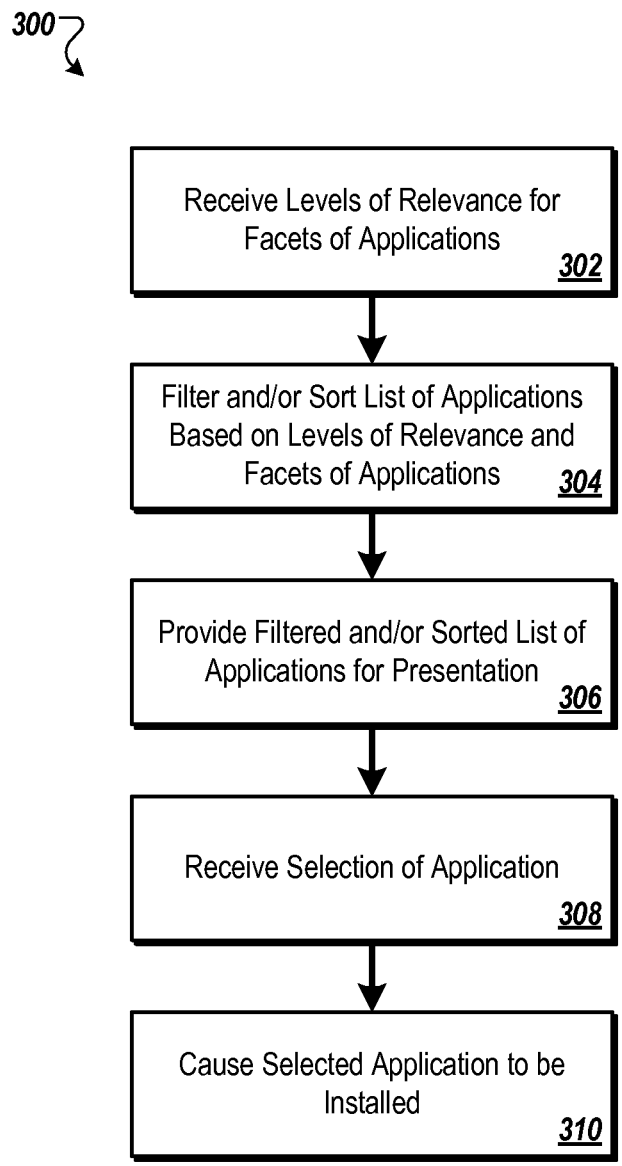
FIG. 3 is flow chart that shows an example of a process for organizing a list of applications based on facets of the applications.

FIG. 3 is a flow chart that shows an example of a process 300 for organizing a list of applications based on facets of the applications. The process 300 may be performed, for example, by a system such as the computing devices 102a-e, the search server 104, and/or the application server 112. For clarity of presentation, the description that follows uses the computing devices 102a-e, the search server 104, and the application server 112 as examples for describing the process 300. However, another system, or combination of systems, may be used to perform the process 300.

The process 300 includes receiving (302), from a computing device, one or more user inputs that include levels of relevance for multiple facets of multiple applications. Each of the facets represents a different set of behaviors from a plurality of behaviors of the applications. In addition, each one of the applications has an associated value for each of the facets based on the set of behaviors of each of the applications. The facets can include two or more different types selected from a money facet type, a time facet type, a content facet type, and a privacy facet type. For example, the search server 104 can receive user inputs from the computing device 102b that include levels of relevance for the time, money, content, and privacy facets.

Subsequently, the process 300 includes organizing (304) a list of the applications based on the levels of relevance for the facets and the value of each of the facets for each of the applications. Organizing the list of the applications can include at least one of sorting or filtering the list of the applications based on the levels of relevance for the facets and the value of each of the facets for each of the applications. For example, the search server 104 can calculate values for the behaviors of each application based on the static and/or runtime analyses of the related operations performed by the applications. The search server 104 can then combine the behaviors of an application for a particular facet into a value for the facet. The search server 104 can then scale the values for the facets of the applications based on the levels of relevance selected by the user. The search server 104 can then sort and/or filter the list of applications based on the scaled values of the facets for the applications.

Next, the process 300 includes providing (306), to the computing device, the list of the applications for presentation on a display device at the computing device. For example, the search server 104 can provide the sorted and/or filtered list of applications to the computing device 102b for presentation on a display device of the computing device 102b.

In some implementations, the process 300 includes receiving (308), from the computing device, a user selection of an application from the list of the applications. For example, a user at the computing device 102b may make an input selecting an application from the list of applications.

In response to receiving the user selection, the process 300 can include causing (310) the application to be installed at the computing device. For example, the user input control selected by the user for the application can cause the request for the application to be sent to the search server 104 and/or the application server 112. In the case where the request is sent to the search server 104, the search server 104 can then redirect the request for the application to the application server 112 and/or the search server 104 can provide the application from the data storage 110 to the computing device 102b. In the case where the selection control causes the request to be sent to the application server 112, the application server 112 can provide the application to the computing device 102b. In the case where the request is redirected to the application server 112, the application server 112 can provide the application to the computing device 102b and/or to the search server 104, which then provides the application to the computing device 102b.

Figure 4:
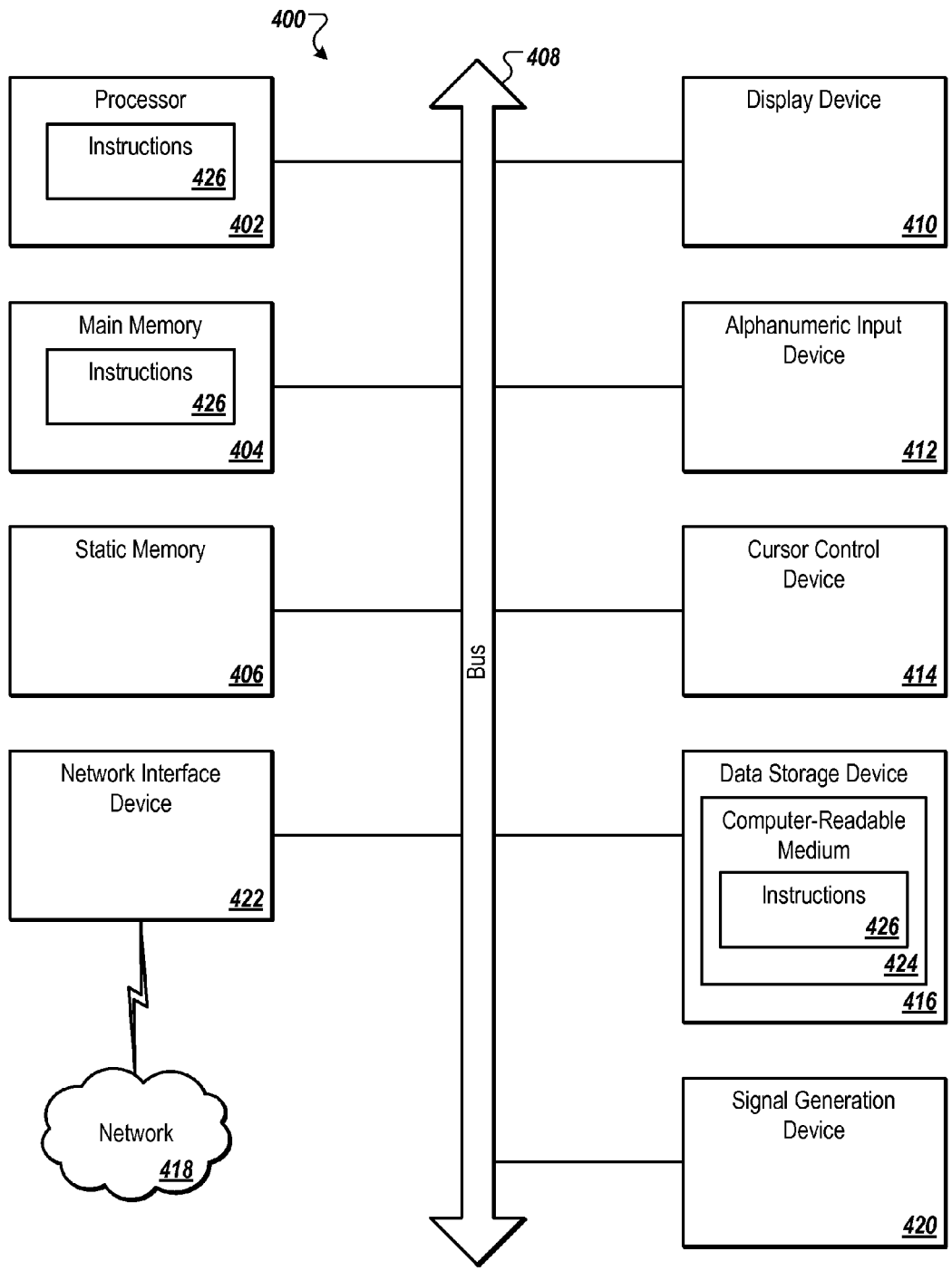
FIG. 4 is a schematic diagram that shows an example of a machine in the form of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the computing devices 102a-e, the search server 104, and/or the application server 112 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the computing devices 102a-e, the search server 104, and/or the application server 112 embodying any one or more of the methodologies or functions described herein. The sets of instructions 426 of the computing devices 102a-e, the search server 104, and/or the application server 112 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
receiving, from a computing device, one or more user inputs that indicate levels of relevance for facets of applications, wherein each of the facets represents different behaviors of the applications, wherein the behaviors are associated with operations performed by the applications, wherein each of the applications has an associated value for each of the facets based on the behaviors of each of the applications, wherein the facets comprise a content facet indicative of types of content presented by the applications, and wherein the one or more user inputs comprise a level of relevance for the content facet based on at least adult or offensive content;
organizing a list of the applications based on the levels of relevance for the facets and the value of each of the facets for each of the applications; and
providing, to the computing device, the list of the applications for presentation on a display device at the computing device.

2. The method of claim 1, wherein organizing the list of the applications comprises at least one of sorting or filtering the list of the applications based on the levels of relevance for the facets and the value of each of the facets for each of the applications.

3. The method of claim 1, further comprising:
receiving, from the computing device, a user selection of an application from the list of the applications; and
in response to receiving the user selection, causing the application to be installed at the computing device.

4. The method of claim 1, wherein the facets comprise two or more different types selected from a money facet type, a time facet type, a content facet type, and a privacy facet type.

5. A non-transitory computer-readable medium storing instructions that when executed cause a computer to perform operations comprising:
receiving, from a computing device, one or more user inputs that indicate levels of relevance for facets of applications, wherein each of the facets represents different behaviors of the applications, wherein the behaviors are associated with operations performed by the applications, wherein each of the applications has an associated value for each of the facets based on the behaviors of each of the applications, wherein the facets comprise a content facet indicative of types of content presented by the applications, and wherein the one or more user inputs comprise a level of relevance for the content facet based on at least adult or offensive content;
organizing a list of the applications based on the levels of relevance for the facets and the value of each of the facets for each of the applications; and providing, to the computing device, the list of the applications for presentation on a display device at the computing device.

6. The non-transitory computer-readable medium of claim 5, wherein organizing the list of the applications comprises at least one of sorting or filtering the list of the applications based on the levels of relevance for the facets and the value of each of the facets for each of the applications.

7. The non-transitory computer-readable medium of claim 5, the operations further comprising:
receiving, from the computing device, a user selection of an application from the list of the applications; and
in response to receiving the user selection, causing the application to be installed at the computing device.

8. The non-transitory computer-readable medium of claim 5, wherein the facets comprise two or more different types selected from a money facet type, a time facet type, a content facet type, and a privacy facet type.

9. A computer-implemented system comprising:
a memory to store values for facets of applications, wherein each of the facets represents different behaviors of the applications, wherein the behaviors are associated with operations performed by the applications, wherein each of the applications has an associated one of the values for each of the facets based on the behaviors of each of the applications, and wherein the facets comprise a content facet indicative of types of content presented by the applications;
an interface to receive, from a computing device, one or more user inputs that include levels of relevance for the facets of the applications, and wherein the one or more user inputs comprise a level of relevance for the content facet based on at least adult or offensive content;
a processor to organize a list of the applications based on the levels of relevance for the facets and the values of the facets for each of the applications, and to provide, to the computing device through the interface, the list of the applications for presentation on a display device at the computing device.

10. The system of claim 9, wherein the processor is further to organize the list of the applications by at least one of sorting or filtering the list of the applications based on the levels of relevance for the facets and the values of the facets for each of the applications.

11. The system of claim 9, wherein the interface is further to receive, from the computing device, a user selection of an application from the list of the applications; and
wherein, in response to receipt of the user selection, the processor is further to cause the application to be installed at the computing device.

12. The system of claim 9, wherein the facets comprise two or more different types selected from a money facet type, a time facet type, a content facet type, and a privacy facet type.

* * * * *